(12) United States Patent
Pandya et al.

(10) Patent No.: US 10,672,003 B2
(45) Date of Patent: Jun. 2, 2020

(54) METHOD AND DEVICE FOR FACILITATING SUPPLY OF A REQUESTED SERVICE

(71) Applicant: MasterCard International Incorporated, Purchase, NY (US)

(72) Inventors: Rupali Devashish Pandya, Pune (IN); Supriya Kumthekar, Pune (IN); Ajit Madhukar Karnik, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 710 days.

(21) Appl. No.: 15/366,765

(22) Filed: Dec. 1, 2016

(65) Prior Publication Data

US 2017/0186013 A1    Jun. 29, 2017

(30) Foreign Application Priority Data

Dec. 24, 2015 (SG) .............................. 10201510658S

(51) Int. Cl.
| | | |
|---|---|---|
| *G06Q 40/00* | (2012.01) | |
| *G06Q 20/40* | (2012.01) | |
| *G06K 19/06* | (2006.01) | |
| *H04L 29/06* | (2006.01) | |
| *G07C 9/25* | (2020.01) | |

(52) U.S. Cl.
CPC .. *G06Q 20/40145* (2013.01); *G06K 19/06037* (2013.01); *G06Q 40/00* (2013.01); *H04L 63/0861* (2013.01); *G07C 9/257* (2020.01)

(58) Field of Classification Search
CPC .......................... G06Q 40/00; G06K 19/06037
See application file for complete search history.

(56) References Cited

U.S. PATENT DOCUMENTS

| | | | |
|---|---|---|---|
| 7,440,924 B2 * | 10/2008 | Buchanan | G06Q 40/00 705/35 |
| 8,706,634 B2 | 4/2014 | Evans et al. | |
| 8,847,733 B2 | 9/2014 | Khan et al. | |
| 8,887,232 B2 | 11/2014 | McKay | |
| 9,043,237 B2 | 5/2015 | McCarthy | |

(Continued)

FOREIGN PATENT DOCUMENTS

WO    2006015073 A2    2/2006

OTHER PUBLICATIONS

Craig Vaream, Image Deposit Solutions, Nov. 2005, JP Morgan Chase, web, 1-13; (Year: 2005).*

(Continued)

*Primary Examiner* — I Jung Liu
(74) *Attorney, Agent, or Firm* — Armstrong Teasdale LLP

(57) ABSTRACT

A method for facilitating supply of a requested service, being supplied after successful identity authentication, is provided. The method includes utilizing a network switch to link a service provider, which offers the requested service, to a biometric data archive, which performs verification of received biometric data to authenticate identity. The method also includes receiving, in the network switch, a result of the biometric data verification from the biometric data archive. The method further includes directing the result to the service provider for the service provider to determine supply of the requested service based on the result.

22 Claims, 4 Drawing Sheets

(56) References Cited

U.S. PATENT DOCUMENTS

| | | |
|---|---|---|
| 9,396,730 B2 | 7/2016 | Karpey et al. |
| 2002/0152169 A1* | 10/2002 | Dutta .................. G06Q 40/02 |
| | | 705/45 |
| 2007/0288998 A1* | 12/2007 | Gudigara ............. G06F 21/32 |
| | | 726/5 |
| 2012/0268247 A1* | 10/2012 | Boot ................... B60L 53/30 |
| | | 705/34 |
| 2013/0179346 A1 | 7/2013 | Kumnick et al. |
| 2014/0164254 A1 | 6/2014 | Dimmick |
| 2015/0149244 A1 | 5/2015 | Unser et al. |
| 2015/0227931 A1 | 8/2015 | Genovez |
| 2015/0235198 A1 | 8/2015 | Liezenberg et al. |
| 2016/0005038 A1 | 1/2016 | Kamal et al. |
| 2016/0012400 A1 | 1/2016 | McCarthy |
| 2016/0328700 A1 | 11/2016 | Bortolotto et al. |
| 2016/0328728 A1 | 11/2016 | Khvostov et al. |

OTHER PUBLICATIONS

PCT International Search Report and Written Opinion, Application No. PCT/US2016/062699, dated Feb. 20, 2017, 11 pps.

\* cited by examiner

METHOD AND DEVICE FOR FACILITATING SUPPLY OF A REQUESTED SERVICE

CROSS REFERENCE TO RELATED APPLICATIONS

This application claims the benefit of Singapore Patent Application No. 10201510658S filed Dec. 24, 2015, which is hereby incorporated by reference in its entirety.

BACKGROUND

The following discloses a method and device for facilitating supply of a requested service.

To ensure that a user who initiates an online transaction for a service or information is legitimate, verification may first be done to authenticate the user. One way of performing such verification may require the user to enter a user ID and a password.

User names and passwords are not the ideal way to authenticate a user as these can be compromised. A further layer of security has a one-time password sent by, for example SMS (short message service), to the user's mobile phone.

Biometric data is also another means to authenticate a user. Indeed, governments collect and keep records of their citizens' biometric data in databases for archiving purposes.

It is envisaged that use of biometric data will become more widespread as a means to perform authentication of a user requesting a service. There is, thus, a need to improve upon the way in which such biometric data is managed in order to meet this increase in demand.

BRIEF DESCRIPTION

According to a first aspect of the disclosure, a method for facilitating supply of a requested service, being supplied after successful identity authentication, is provided. The method includes utilizing a network switch to link a service provider, which offers the requested service, to a biometric data archive, which performs verification of received biometric data to authenticate identity, receiving, in the network switch, a result of the biometric data verification from the biometric data archive, and directing the result to the service provider for the service provider to determine supply of the requested service based on the result.

According to a second aspect of the disclosure, a network switch for relaying messages that facilitate supply of a requested service, being supplied after successful identity authentication, is provided. The network switch includes at least one processor, and at least one memory including computer program code, the at least one memory and the computer program code configured to, with the at least one processor, cause the network switch at least to receive a result of the biometric data verification from a biometric data archive, which performs verification of received biometric data to authenticate identity, direct the result to a service provider, which offers the requested service, for the service provider to determine supply of the requested service based on the result.

BRIEF DESCRIPTION OF THE DRAWINGS

Embodiments of the disclosure will be better understood and readily apparent to one of ordinary skill in the art from the following written description, by way of example only, and in conjunction with the drawings.

DETAILED DESCRIPTION

Figure 1:
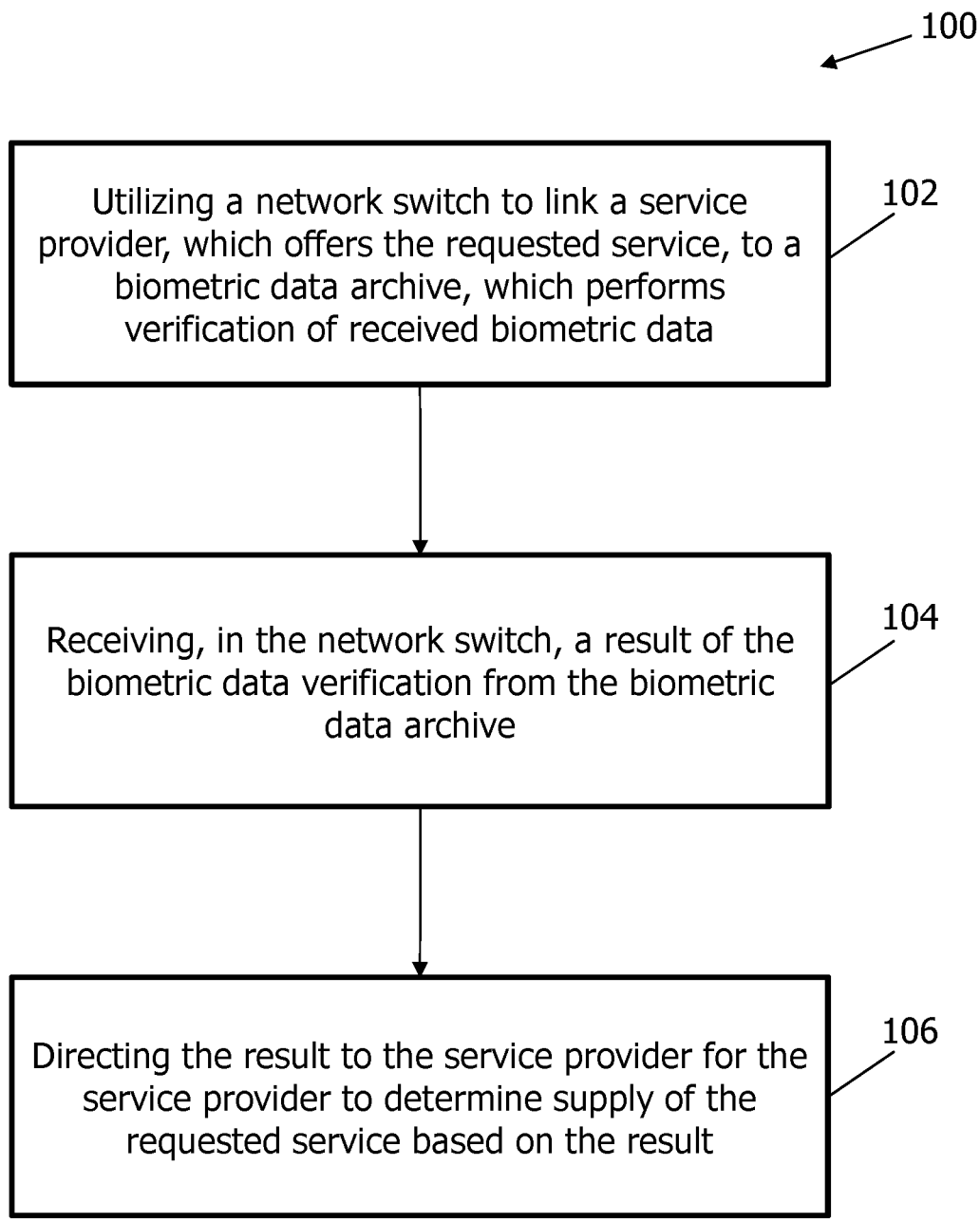
FIG. 1 shows a method for facilitating supply of a requested service.

Embodiments of the present disclosure will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission, or display devices.

The present specification also discloses apparatus for performing the operations of the methods. Such apparatus may be specially constructed for the required purposes, or may include a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices, such as magnetic or optical disks, memory chips, or other storage devices suitable for interfacing with a computer. The computer readable medium may also include a hard-wired medium such as exemplified in the Internet system, or wireless medium, such as exemplified in the GSM mobile telephone system. The computer program when loaded and executed on a computer effectively results in an apparatus that implements the steps of the preferred method.

FIG. 1 shows a method 100 for facilitating supply of a requested service. The requested service may be intangible (such as a request for access to medical records, a request for a balance of a retirement fund, or a request for a status update of a response to an enquiry made with a government body) and leads to the supply or provision of an intangible service (such as being provided, in electronic form: the requested medical records, the requested balance in the retirement fund, or a projected response date to the enquiry). However, it will be appreciated that the requested service may also lead to the supply or provision of a tangible service (such as a medical examination by a physician, a meeting with a financial planner who manages the retirement fund, or a visit by a government official to act on the enquiry) or a physical good (such as prescribed medicine, an annuity withdrawal schedule, or an item issued by the government body to address the enquiry). Accordingly, the requested service may be a financial service or a non-financial service. Examples of financial services include any transaction that involves payment from one party to another, where such transactions include any one or more of banking transactions, card scheme network transactions (such as those used in the four party model used by Visa® or MasterCard®), or a fund transfer between two parties. Examples of non-financial service include transactions that seek to access data, where such transactions include the provision of medical data, personal particulars (such as residential address, marital status, and profession), personal assets, or information required by government institutions to perform their designated function. The requested service is supplied after successful identity authentication through verification of a data parameter that is unique to the party requesting the service, such as biometric data. Accordingly, the requested service is typically connected with such a party, such as his medical history and his personal particulars.

The method 100 includes the following steps 102, 104, and 106.

In step 102, a network switch is utilize to link a service provider, which offers the requested service, to a biometric data archive, which performs verification of received biometric data. The network switch is typically a computer server, which is understood to mean a single computing device or a plurality of interconnected computing devices. That is, the network switch may exist as a single hardware unit or be distributed among several hardware units. The network switch serves to connect the various computing devices (such as the service provider) which implement the method 100. The network switch receives communication packets from one of these computing devices and directs the communication packets to another of these computing devices, whereby these communication packets enable the computing devices to perform their respective function which leads to the service provider supplying the requested service. The link that the network switch establishes is, therefore, a data communication channel between the service provider and the biometric data archive. To establish this data communication channel, one or more routers may be present between the network switch and the service provider and one or more routers may be present between the network switch and the biometric data archive. The service provider may be any party with which a transaction for a requested service is made and requires the consumer that requests the service to first authenticate herself. The service provider includes any party that provides a financial or a non-financial service, whereby the service provider can be any one or more of a merchant, a government institution, a medical services provider, an information provider, and a financial institution. The biometric data archive may be a computer with a secure database that contains entries of encrypted biometric data, with each entry being assigned a user account. The biometric data may be derived from one or more of fingerprint, facial and retina physiological features, along with heart signals, of the party that desires the requested service. The biometric data archive is provided with a communication interface that is able to receive biometric data that is transmitted by an external device, such as a mobile device or the service provider. The biometric data archive is also provided with a processor to verify the biometric data received over an adequately secure communication channel by analyzing whether the received biometric data has a match in its stored biometric data. If such a match exists, the result of the biometric data verification is successful verification of the biometric data. If no match exists, the result of the biometric data verification is an unsuccessful verification of the biometric data. Due to the sensitivity of biometric data, the biometric data archive may be managed by a government or its authorized body that is responsible for keeping such records. The use of biometric data to perform identity authentication is also advantageous in the provision of critical medical services, such as when a patient is incapacitated and, therefore, unable to provide details that can be used to retrieve his medical records. One or more of his biometric features may be scanned to identify the patient.

In step 104, the network switch receives a result of the biometric data verification from the biometric data archive. The network switch processes the communication packet that contains the result to ascertain the service provider that should receive the result. In step 106, the network switch directs the result to the service provider for the service provider to determine supply of the requested service based on the result of the biometric data verification.

The method 100 may be implemented in several ways. A first exemplary implementation is shown in FIG. 2.

Figure 2:
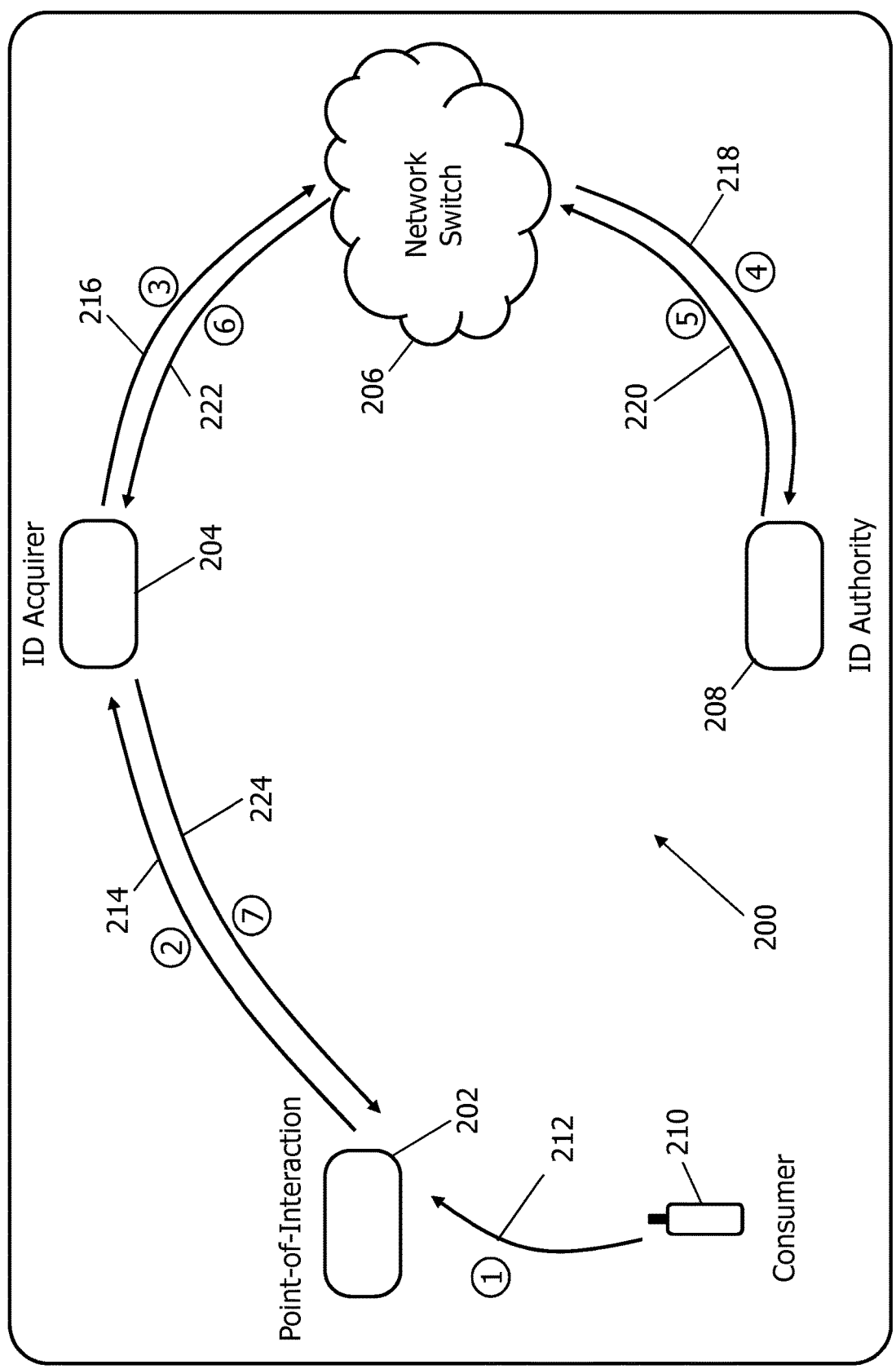
FIG. 2 shows a schematic of a system that uses a first implementation of the method shown in FIG. 1.

FIG. 2 shows a schematic of a system 200 that uses the first implementation of the method 100. The system 200 includes a service provider 202, an identity acquirer 204, a network switch 206, and a biometric data archive 208. The service provider 202, the network switch 206, and the biometric data archive 208 respectively function as described above with respect to step 102 of the method 100. It is generally impractical (because of cost, complexity, and security concerns) to provide a direct connection from one or more such service providers 202 to the high-speed, high-reliability, and highly secure network that the network switch 206 provides. The identity acquirer 204, thus, serves as a facilitator that allows the service provider 202 to connect with the network switch 206. The identity acquirer 204 provides the necessary hardware architecture that supports the protocol required to communicate with that used by the network switch 206. The system 200 ensures that all relationships, such as between (i) the service provider 202 and the identity acquirer 204, (ii) the identity acquirer 204 and the network switch 206, and (iii) the network switch 206 and the biometric data archive 208, continue to have a high degree of trust, mutually agreed processes (for accounting, settlement of charges and fees) and other functionality.

The network switch 206 provides an efficient and practical set-up to link the biometric data archive 208 to the service provider 202 and alleviates the architectural difficulty in setting up point-to-point communication between all service providers and biometric data archives, and/or point-to-point communication between mirrors of these service providers and mirrors of these biometric data archives. A mirror, in the present context, may refer to a distribution of logical and/or physically replicates of these service providers and biometric data archives to ensure a high up-time (availability) as well as quick response. Comparing the system 200 with the four party model used by Visa® or MasterCard® to process a payment transaction made using their card, the network switch 206 of the system 200 is analogous to the Visa® or MasterCard® network of the four party model. In the four party model, the acquirer is called so because it 'acquires' the transaction information from the merchant (and card holder). The issuer is so called because it is the entity that has 'issued' the card being used for effecting the payment. For the system 200, the identity acquirer 204 'acquires' the encrypted biometric identification information from the service provider 202 (which may be, as mentioned above, a merchant, a government institution, a medical services provider, an information provider and a financial institution). As for the biometric data archive 208, it already is populated with data from, for example, government bodies responsible for collecting biometric identification information and is, therefore, able to verify the biometric identification information transmitted by the service provider 202 via the identity acquirer 204 and the network switch 206. The network switch 206 essentially carries information between the identity acquirer 204 and the biometric data archive 208 in data packets formatted in mutually compatible rules and protocols, so that both the identity acquirer 204 and the biometric data archive 208 can transform, packetize, and communicate information in an understandable manner. These protocols are in accordance with a communication standard, such as the Open System Interconnection or OSI, where protocols are defined in seven layers ranging from the Physical layer to the Application layer.

Accordingly, the switching function that the Visa® or MasterCard® network provides can be tapped upon to realize the switching function that the network switch 206 requires to implement the method 100 of FIG. 1. This is because the Visa® or MasterCard® network, similar to the network switch 206, essentially carries information between the acquirer and the issuer in data packets formatted in specific rules and protocols. While the information content in data packets used for effecting payments is different from that in data packets used to verify biometric identity, there is commonality in the lower layers of the OSI used to circulate these two different data packets, i.e. both data packets use the same communication protocol. Accordingly, the Visa® or MasterCard® network does not need to be modified when used to implement the network switch 206. The task of inserting and extracting the biometric data from the data packets circulating in the system 200 is performed by application software residing respectively at the service provider 202 and the biometric data archive 208. When using computer systems already involved in processing payments to perform the role of the service provider 202 and the biometric data archive 208, these systems will have to be modified to process data packets containing biometric data by having similar application software as that used by the service provider 202 and the biometric data archive 208.

It is advantageous to use a financial payment network, which meets the ISO 8583 industrial standard, to realize the network switch 206 because the financial payment network is designed to process heavy transaction loads, yet ensures almost instantaneous response and is also secure. In addition, a financial payment network has low latency and is readily available from being logically and physically distributed across a number of centers and across different geographical locations. Typically, such financial payment networks process data that facilitates financial transactions rather than non-financial transactions and are not tapped upon to facilitate non-financial transactions.

A consumer 210 requests 212 for a service that is offered by the service provider 202. At this point, the service is not yet supplied by the service provider 202 as supply of the service first requires that the consumer 210 be authenticated, i.e. it has to be verified that the requested service can indeed be supplied to the consumer 210.

In order to authenticate the consumer 210, the following procedure may occur during this request 212. When prompted for an identification, the consumer 210 places her finger on a biometric sensor of her mobile device. An application on the mobile device encrypts the biometric data read by the sensor and sends it to a Point-of-Interaction (Pop device at the service provider 202. This application may be specifically designed to create data compatible with the biometric data archive 208, so that an information packet sent by the application includes, in addition to the encrypted biometric data, details of the biometric data archive 208 and any routing information that facilitates for the information packet to reach its destination, namely the biometric data archive 208.

Upon receiving the information packet, the service provider 202 includes its own identification data into the information packet. The information packet is then transmitted 214 to the identity acquirer 204.

The identity acquirer 204 extracts details of the biometric data archive 208 (or its mirror) from the information packet and adds other header data (such as identification data of the identity acquirer 204) and forwards 216 the information packet to the network switch 206.

The network switch 206 analyzes the received information packet to determine the biometric data archive 208 or mirror to which the information packet should be switched or forwarded. In this manner, the network switch 206 receives the biometric data since the information packet contains the biometric data and directs the biometric data to the biometric data archive 208 for verification. Although only one biometric data archive 208 is shown in FIG. 2, the network switch 206 may be linked to a plurality of biometric data archives and the network switch 206 is configured to send the information packet containing the biometric data to the designated biometric data archive. That is, the network switch 206 is configured to identify the biometric data archive to which the biometric data is directed 218 from the plurality of biometric data archives.

The biometric data archive 208 or its designated mirror extracts the encrypted biometric data from the information packet received from the network switch 206. The biometric data archive 208 is able to extract the biometric data as it has the cryptographic keys required to decrypt the encrypted biometric data from being the party that provided the application, as explained above. The biometric data archive 208 then verifies the received biometric data by determining whether the biometric data matches a record entry of biometric data stored in a database of the biometric data archive 208. The result of the biometric data verification is either a successful verification which sets up an "ID Verified" message, or an unsuccessful verification of which sets up an "Unable to Verify ID" message. As the biometric data archive 208 also takes note of details of the identity acquirer 204 and the service provider 202 embedded in the information packet received from the network switch 206, the biometric data archive 208 is able to assemble a response data packet that is to be returned to the service provider 202 through the identity acquirer 204. This response data packet contains the result of the biometric data verification and the details of the identity acquirer 204 and the service provider 202.

The response data packet follows a return path in comparison to the one taken by the information packet. The response data packet is transmitted 220 to the network switch 206, so that the network switch 206 receives the result of the biometric data verification from the biometric data archive 208. The network switch 206 then directs this result to the service provider 202 for the service provider 202 to determine supply of the requested service based on the result. As the response data packet indicates a routing path that uses the identity acquirer 204 to link the service provider 202 to the network switch 206, the network switch 206 transmits 222 the response data packet to the identity acquirer 204. The identity acquirer 204 in turn sends 224 the response data packet to the service provider 202. Upon receipt, the service provider 202 analyzes the result of the biometric data verification that is embedded in the response data packet to determine whether the requested service should be supplied to the consumer 210. A determination of a successful verification fulfils the transaction, i.e. the requested service is supplied in response to the successful verification, while a determination of an unsuccessful verification declines the supply of the requested service.

Figure 3:
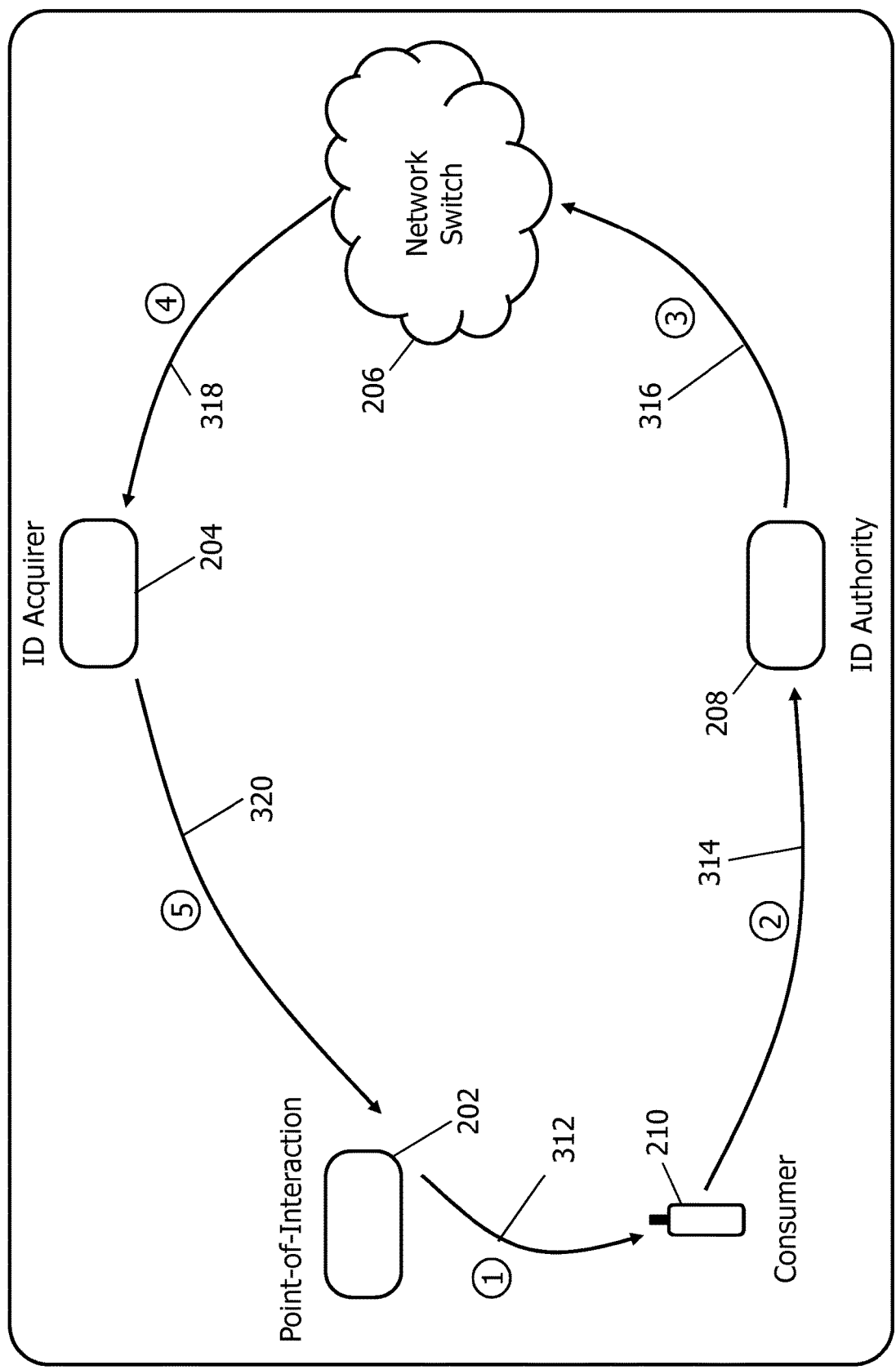
FIG. 3 shows a schematic of a system that uses a second implementation of the method shown in FIG. 1.

A second exemplary implementation of the method 100 of FIG. 1 is shown in FIG. 3. The system 200 shown in FIG. 3 is the same as that of FIG. 2, i.e. the system 200 of FIG. 3 includes a service provider 202, an identity acquirer 204, a network switch 206, and a biometric data archive 208, as described with respect to FIG. 2.

When prompted for an identification, an application on the mobile device of the consumer 210 collects 312 information from the service provider 202. This information include details, such as the identification of the service provider 202 and the identity acquirer 204, a unique transaction number, all of which is necessary to have the service provider 202 provide the requested service after the consumer 210 is authenticated. The information may be transmitted 312 to the mobile device through QR (Quick Response) code, NFC (Near Field Communication) tap, BLE (Bluetooth Low Energy), or any other transmission mechanism.

Similar to FIG. 2, the application on the mobile device may be specifically designed to create data that is compatible with the biometric data archive 208. The consumer 210 places her finger on a biometric sensor of the mobile device for the mobile device to capture biometric data and encrypt it. However, in contrast to FIG. 2, the application on the mobile device transmits 314 the information packet that contains the biometric data directly to the biometric data archive 208. Accordingly, the information packet does not require routing information. Thus, the biometric data archive 208 receives the biometric data for verification from a mobile device. The transmission 314 of this information packet may be over mobile data or a WiFi network.

The biometric data archive 208 extracts the encrypted biometric data from the information packet received from the network switch 206. Similar to FIG. 2, the biometric data archive 208 is able to extract the biometric data as it has the cryptographic keys required to decrypt the encrypted biometric data from being the party that provided the application, as explained above. The biometric data archive 208 then verifies the received biometric data by determining whether the biometric data matches a record entry of biometric data stored in a database of the biometric data archive 208. The result of the biometric data verification is either a successful verification which sets up an "ID Verified" message, or an unsuccessful verification of which sets up an "Unable to Verify ID" message. As the biometric data archive 208 also takes note of details of the identity acquirer 204 and the service provider 202 embedded in the information packet, the biometric data archive 208 is able to assemble a response data packet that contains details of the service provider 202 and the identity acquirer 204, along with the result of the biometric data verification.

The response data packet is transmitted 316 to the network switch 206, so that the network switch 206 receives the result of the biometric data verification from the biometric data archive 208. The network switch 206 then directs this result to the service provider 202 for the service provider 202 to determine supply of the requested service based on the result.

Although only one service provider 202 is shown in FIG. 3, the network switch 206 may be linked to a plurality of service providers and the network switch 206 is configured to send the information packet containing the biometric data to the designated service provider. That is, the network switch 206 is configured to identify the service provider to which the biometric data is directed from the plurality of service providers. The network switch 206 is able to identify the correct service provider from, for example, reading the identification data of the service provider 202 embedded in the response data packet.

In the embodiment shown in FIG. 3, as the response data packet indicates a routing path that uses the identity acquirer 204 to link the service provider 202 to the network switch 206, the network switch 206 transmits 318 the response data packet to the identity acquirer 204. The identity acquirer 204 in turn sends 320 the response data packet to the service provider 202. Upon receipt, the service provider 202 analyzes the result of the biometric data verification that is embedded in the response data packet to determine whether the requested service should be supplied to the consumer 210. A determination of a successful verification fulfils the transaction, i.e. the requested service is supplied in response to the successful verification, while a determination of an unsuccessful verification declines the supply of the requested service.

Comparing FIGS. 2 and 3, it can be seen that both implementations utilize the network switch 206 to link the service provider 202, which offers the requested service, to the biometric data archive 208, which performs verification of received biometric data to authenticate identity. The network switch 206 receives a result of the biometric data verification from the biometric data archive 208 and directs the result to the service provider 202 for the service provider 202 to determine supply of the requested service based on the result of the biometric data verification.

Figure 4:
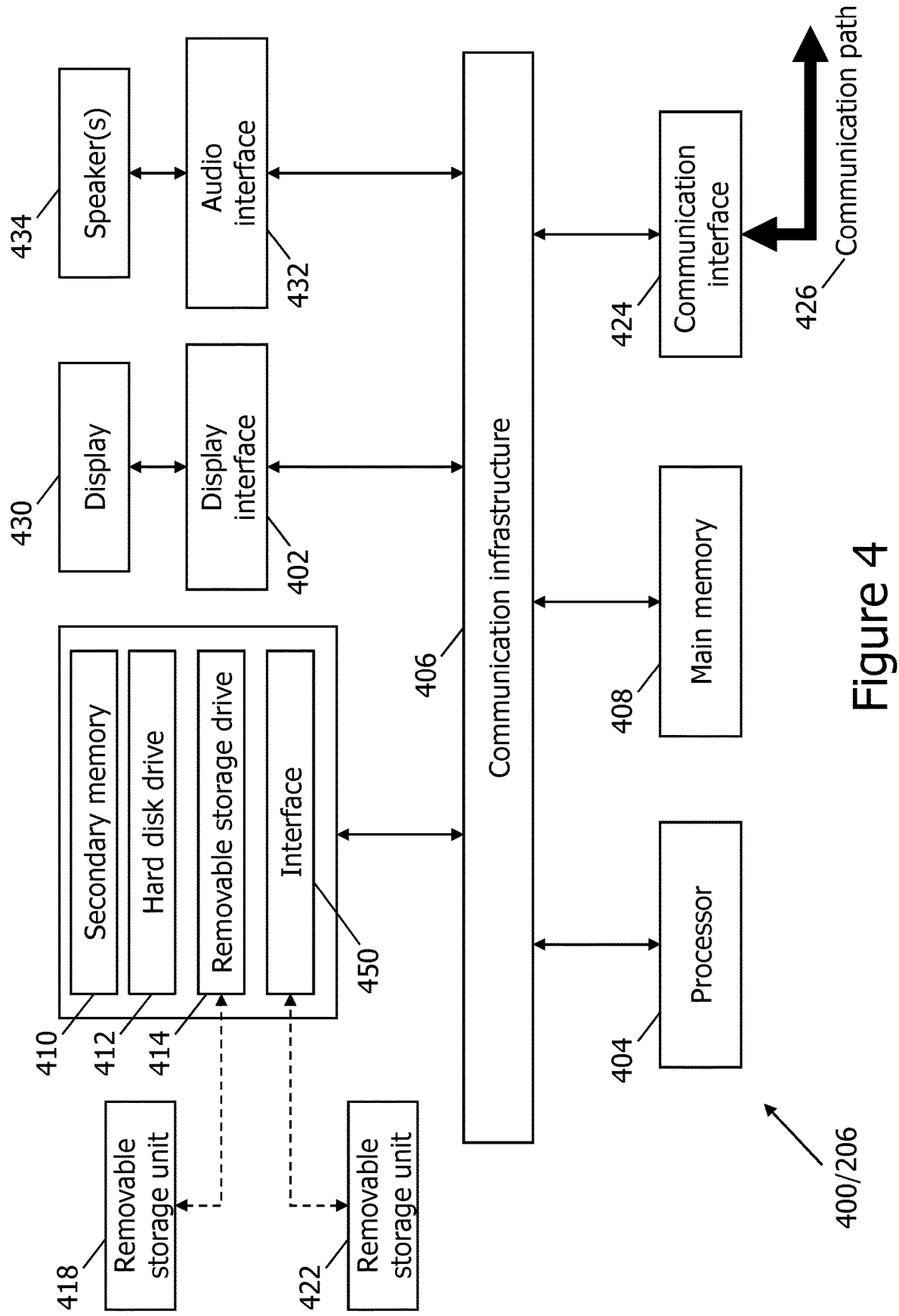
FIG. 4 shows a schematic of a computing device used to realize a network switch used in the systems of FIGS. 2 and 3.

FIG. 4 depicts an exemplary computing device 400, hereinafter interchangeably referred to as a computer system 400, where one or more such computing devices 400 may be used to execute the method 100 of FIG. 1. The exemplary computing device 400 can be used to implement the network switch 206 shown in FIGS. 2 and 3. The following description of the computing device 400 is provided by way of example only and is not intended to be limiting.

As shown in FIG. 4, the example computing device 400 includes a processor 404 for executing software routines. Although a single processor is shown for the sake of clarity, the computing device 400 may also include a multi-processor system. The processor 404 is connected to a communication infrastructure 406 for communication with other components of the computing device 400. The communication infrastructure 406 may include, for example, a communications bus, cross-bar, or network.

The computing device 400 further includes a main memory 408, such as a random access memory (RAM), and a secondary memory 410. The secondary memory 410 may include, for example, a storage drive 412, which may be a hard disk drive, a solid state drive, or a hybrid drive, and/or a removable storage drive 414, which may include a magnetic tape drive, an optical disk drive, a solid state storage drive (such as a USB flash drive, a flash memory device, a solid state drive, or a memory card), or the like. The removable storage drive 414 reads from and/or writes to a removable storage medium 444 in a well-known manner. The removable storage medium 444 may include magnetic tape, optical disk, non-volatile memory storage medium, or the like, which is read by and written to by removable storage drive 414. As will be appreciated by persons skilled in the relevant art(s), the removable storage medium 444 includes a computer readable storage medium having stored therein computer executable program code instructions and/or data.

In an alternative implementation, the secondary memory 410 may additionally or alternatively include other similar means for allowing computer programs or other instructions to be loaded into the computing device 400. Such means may include, for example, a removable storage unit 422 and an interface 430. Examples of a removable storage unit 422 and interface 430 include a program cartridge and cartridge interface (such as that found in video game console devices), a removable memory chip (such as an EPROM or PROM) and associated socket, a removable solid state storage drive (such as a USB flash drive, a flash memory device, a solid state drive, or a memory card), and other removable storage units 422 and interfaces 430 which allow software and data to be transferred from the removable storage unit 422 to the computer system 400.

The computing device 400 also includes at least one communication interface 424. The communication interface 424 allows software and data to be transferred between computing device 400 and external devices via a communication path 426. In various embodiments of the disclosure, the communication interface 424 permits data to be transferred between the computing device 400 and a data communication network, such as a public data or private data communication network. The communication interface 424 may be used to exchange data between different computing devices 400 which such computing devices 400 form part an interconnected computer network. Examples of a communication interface 424 may include a modem, a network interface (such as an Ethernet card), a communication port (such as a serial, parallel, printer, GPIB, IEEE 1394, RJ45, USB), an antenna with associated circuitry, and the like. The communication interface 424 may be wired or may be wireless. Software and data transferred via the communication interface 424 are in the form of signals which can be electronic, electromagnetic, optical, or other signals capable of being received by communication interface 424. These signals are provided to the communication interface via the communication path 426.

As shown in FIG. 4, the computing device 400 further includes a display interface 402 which performs operations for rendering images to an associated display 430 and an audio interface 432 for performing operations for playing audio content via associated speaker(s) 434.

As used herein, the term "computer program product" may refer, in part, to removable storage medium 444, removable storage unit 422, a hard disk installed in storage drive 412, or a carrier wave carrying software over communication path 426 (wireless link or cable) to communication interface 424. Computer readable storage media refers to any non-transitory, non-volatile tangible storage medium that provides recorded instructions and/or data to the computing device 400 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive, or a memory card), a hybrid drive, a magneto-optical disk, or a computer readable card, such as a PCMCIA card, and the like, whether or not such devices are internal or external of the computing device 400. Examples of transitory or non-tangible computer readable transmission media that may also participate in the provision of software, application programs, instructions, and/or data to the computing device 400 include radio or infra-red transmission channels as well as a network connection to another computer or networked device, and the Internet or Intranets including e-mail transmissions and information recorded on Websites and the like.

The computer programs (also called computer program code) are stored in main memory 408 and/or secondary memory 410. Computer programs may also be received via the communication interface 424. Such computer programs, when executed, enable the computing device 400 to perform one or more features of embodiments discussed herein. In various embodiments, the computer programs, when executed, enable the processor 404 to perform features of the above-described embodiments. Accordingly, such computer programs represent controllers of the computer system 400.

Software may be stored in a computer program product and loaded into the computing device 400 using the removable storage drive 414, the storage drive 412, or the interface 450. The computer program product may be a non-transitory computer readable medium. Alternatively, the computer program product may be downloaded to the computer system 400 over the communications path 426. The software, when executed by the processor 404, causes the computing device 400 to perform the necessary operations to execute the method 100 as shown in FIG. 1.

It is to be understood that the embodiment of FIG. 4 is presented merely by way of example to explain the operation and structure of the network switch 202. Therefore, in some embodiments one or more features of the computing device 400 may be omitted. Also, in some embodiments, one or more features of the computing device 400 may be combined together. Additionally, in some embodiments, one or more features of the computing device 400 may be split into one or more component parts.

When used to realize the network switch 206 of FIGS. 2 and 3, the computing device 400 is configured to relay messages that facilitate supply of a requested service. The requested service is supplied after successful identity authentication, through use of biometric data. The processor 404 and computer program code stored in the memory 408 are configured to cause the network switch 206 to receive a result of the biometric data verification from the biometric data archive 208. As mentioned in FIGS. 2 and 3, the biometric data archive 208 performs verification of received biometric data. The processor 404 and computer program code stored in the memory 408 are further configured to cause the network switch 206 to direct the result to the service provider 202, which offers the requested service. The service provider 202 then determines supply of the requested service based on the result of the biometric data verification. The network switch 206 may be further configured to communicate with the service provider 202 through the identity acquirer 204.

As explained with respect to FIG. 3, the network switch 206 is further configured to identify the service provider 202 to which the result is directed from a plurality of service providers.

As explained with respect to FIG. 2, the network switch 206 is further configured to receive the biometric data and direct, to the biometric data archive 208, the biometric data for verification. Since the implementation of FIG. 2 has the network switch 206 receiving the biometric data for relaying to the biometric data archive 208, the network switch 206 may be further configured to identify the biometric data archive 208 to which the biometric data is directed from a plurality of biometric data archives. Alternatively, in the implementation of FIG. 3, the network switch 206 does not receive the biometric data. Rather, the biometric data archive 208 receives the biometric data for verification from a mobile device.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

What is claimed is:

1. A method for facilitating supply of a requested service, the requested service being supplied after successful identity authentication, the method implemented by a network switch, the method comprising:
   linking, by the network switch, a service provider with one or more biometric data archives of a plurality of biometric archives, the service provider being different from the one or more biometric data archives;
   receiving, at the network switch, an information packet including i) biometric data and ii) information associated with a biometric data archive of the plurality of biometric data archives;
   identifying, by the network switch using the received information packet, one of the plurality of biometric data archives, the identified biometric data archive configured to perform verification of the received biometric data to authenticate identity;
   forwarding, by the network switch, the received biometric data to the identified biometric data archive;
   receiving, at the network switch, a result of the biometric data verification from the identified biometric data archive; and
   directing the result to the service provider for the service provider to determine supply of the requested service based on the result.

2. The method of claim 1, wherein the network switch is linked to a plurality of service providers and wherein the network switch is configured to identify the service provider to which the result is directed from the plurality of service providers.

3. The method of claim 1, wherein the biometric data archive receives the biometric data for verification from a mobile device.

4. The method of claim 1, further comprising:
   receiving, in the network switch, the biometric data; and
   directing, to the biometric data archive, the biometric data for verification.

5. The method of claim 4, wherein the network switch is linked to a plurality of biometric data archives and wherein the network switch is configured to identify the biometric data archive to which the biometric data is directed from the plurality of biometric data archives.

6. The method of claim 1, wherein the network switch is linked to the service provider through an identity acquirer.

7. The method of claim 1, wherein the result is a successful verification of the biometric data or an unsuccessful verification of the biometric data.

8. The method of claim 1, wherein the biometric data is derived from one or more of fingerprint, facial and retina physiological features.

9. The method of claim 1, wherein the requested service comprises financial services or non-financial services.

10. The method of claim 9, wherein the financial services comprise any one or more of banking transactions, card scheme network transactions, or a fund transfer.

11. The method of claim 9, wherein the non-financial services comprise the provision of any one or more of medical data, personal particulars, or personal assets.

12. A network switch for relaying messages that facilitate supply of a requested service, the requested service being supplied after successful identity authentication, the network switch comprising:
   at least one processor; and
   at least one memory including computer program code;
   wherein the at least one processor and the computer program code are configured to cause the network switch to:
   link a service provider to one or more biometric data archives of a plurality of biometric archives, the service provider being different from the one or more biometric data archives;
   receive an information packet including i) biometric data and ii) information associated with a biometric data archive of the plurality of biometric data archives;
   identify, using the received information packet, one of the plurality of biometric data archives, the identified biometric data archive configured to perform verification of the received biometric data to authenticate identity;
   forward the received biometric data to the identified biometric data archive;
   receive a result of the biometric data verification from the identified biometric data archive; and
   direct the result to the service provider for the service provider to determine supply of the requested service based on the result.

13. The network switch of claim 12, wherein the network switch is further configured to identify the service provider to which the result is directed from a plurality of service providers.

14. The network switch of claim 12, wherein the biometric data archive receives the biometric data for verification from a mobile device.

15. The network switch of claim 12, wherein the network switch is further configured to:

receive the biometric data; and direct, to the biometric data archive, the biometric data for verification.

16. The network switch of claim 15, wherein the network switch is further configured to identify the biometric data archive to which the biometric data is directed from a plurality of biometric data archives.

17. The network switch of claim 12, wherein the network switch is further configured to communicate with the service provider through an identity acquirer.

18. The network switch of claim 12, wherein the result is a successful verification of the biometric data or an unsuccessful verification of the biometric data.

19. The network switch of claim 12, wherein the biometric data is derived from one or more of fingerprint, facial and retina physiological features.

20. The network switch of claim 12, wherein the requested service comprises financial services or non-financial services.

21. The network switch of claim 20, wherein the financial services comprise any one or more of banking transactions, card scheme network transactions, or a fund transfer.

22. The network switch of claim 20, wherein the non-financial services comprise the provision of any one or more of medical data, personal particulars, or personal assets.

\* \* \* \* \*

UNITED STATES PATENT AND TRADEMARK OFFICE
CERTIFICATE OF CORRECTION

PATENT NO. : 10,672,003 B2
APPLICATION NO. : 15/366765
DATED : June 2, 2020
INVENTOR(S) : Rupali Devashish Pandya et al.

Page 1 of 1

It is certified that error appears in the above-identified patent and that said Letters Patent is hereby corrected as shown below:

In the Specification

Column 6, Lines 27-28, delete "Point-of-Interaction (Pop device" and insert therefor
-- Point-of-Interaction (PoI) device --.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*